2,975,062
COMPOSITIONS CONTAINING COCOA-BUTTER SUBSTITUTES

Cornelis Johannes Soeters, Rotterdam, Netherlands, Hermann Pardun, Kleve, Germany, and Antony Crossley, Wallasey, and Stanley Paul, Prenton, Birkenhead, England, assignors to Lever Brothers Company, New York, N.Y., a corporation of Maine No Drawing. Filed Oct. 29, 1956, Ser. No. 618,682

Claims priority, application Great Britain Oct. 31, 1955

7 Claims. (Cl. 99—118)

This invention relates to cocoa-butter substitutes, to processes for preparing the same and to products containing them.

The main use of cocoa-butter is in chocolate. In the manufacture of good quality chocolate, the "nib," or decorticated cocoa bean, is ground and to it are added sugar, flavourings and additional cocoa-butter, together with milk powder in the case of milk chocolate. The amount of additional cocoa-butter depends upon the type of chocolate and is usually between 25% and 100% of the amount of cocoa-butter already present in the ground "nib." The cocoa-butter content of such chocolate is largely responsible for its physical characteristics; cocoa-butter is unusual among naturally-occurring fats in that it is normally a brittle solid to about 25° C., has a relatively narrow melting range and is almost completely liquid at 35° C.

Cocoa-butter is expensive and many attempts have been made to find a cheaper fat to substitute for at least part of the cocoa-butter which is added to the ground "nib." In addition, attempts have been made to find a fat which can be used to make chocolate from partly or completely defatted cocoa.

The present invention is based on the discovery that certain fractions obtained from mutton or beef tallow can be used as partial or complete substitutes for cocoa-butter in chocolate, and also in other products in which cocoa-butter is normally used, for example, couvertures for confectionery.

The present invention provides a process for preparing a cocoa-butter substitute which comprises fractionally crystallizing mutton or beef tallow from a solvent to remove at least 35%, by weight of the tallow, of the lowest melting glyceride fraction.

The present invention also comprises a method of preparing products in which cocoa-butter is normally incorporated, characterised in that cocoa-butter is replaced by a mutton or beef tallow fraction having an iodine value within the range of about 28 to 40, preferably 28 to 35, and more particularly 28 to 33, a softening point in the range of about 30 to 45° C., and preferably not higher than 40° C., and a dilation at 20° C. of not less than 1200, and preferably not less than 1400.

More preferably, the dilation at 20° C. for the mutton or beef tallow fraction is not less than 1500.

The actual value of the dilation at 20° C. which the tallow fractions to be used according to the invention should possess depends upon the desired quality of the product and the degree of replacement of cocoa-butter by the tallow fraction. When used to replace between 25 to 30% of the cocoa-butter in the final product useful results with mutton or beef tallow can be obtained when the dilation at 20° C. is at least 1400 and the softening point not over 40° C. When even smaller proportions of substitute are used, for example 10% of the total, useful results can be obtained with mutton or beef tallow when the dilation at 20° C. is at least 1300 and the softening point is not over 43° C. Because of the relative cost of cocoa-butter and the substitute according to the invention, a substitution of even 5% of the cocoa-butter by the tallow fraction is useful and at such a proportion the softening point of the substitute may be even higher than 43° C.

The tallow fraction can be mixed with cocoa-butter prior to incorporation in chocolate, and the invention accordingly includes mixtures of cocoa-butter and a fraction of mutton or beef tallow having the characteristics set out above.

In order to obtain the specified fraction from the tallow, it is essential to remove from the latter a substantial low melting point fraction. It is also preferable, but not always necessary in the case of fractions to be used in low proportion to cocoa-butter to remove a high melting point fraction. The yield of tallow fraction having the specified properties appears to be between 20 and 35%. Roughly 35 to 55% of low melting fractions have to be removed from the tallow. The high melting fraction to be removed may be as much as 20 to 30%.

The fractionation of the tallow may be carried out by crystallising fractionally in the presence of a solvent. When only the lowest melting glycerides are to be removed a single crystallisation may suffice, but it may be advantageous to carry out the removal in two or more crystallisations; similarly, when the highest and lowest melting glycerides are to be removed two or more crystallisations can be used. In the following description of fractionation procedure, substantially anhydrous acetone is used as the solvent but other suitable solvents such as ether and light petroleum may be used.

In order to remove the lowest melting glycerides in a single crystallisation, an amount of acetone between 3 and 10 mls. per gm. of fat can be used. The larger the number of crystallisations or washes, the lower will be the ratio of acetone to fat that can be used. The temperature of crystallisation depends on the conditions used, in particular the solvent ratio. With ratios of the order given and with a single crystallisation, a temperature of from $-5°$ C. to about $10°$ C. may be used.

Various cooling procedures may be used. The tallow may be dissolved in acetone at 25° C. or higher and then the solution cooled to the desired temperature. The solution may be allowed to cool undisturbed, but the time required is shortened considerably (20–30 minutes instead of many hours) if it is stirred throughout. Cooling may also be effected by distilling off part of the solvent under reduced pressure. An alternative procedure is to mix cold acetone with hot tallow, the temperatures of these being such that the mixture is at the desired crystallisation temperature.

All crystallisations are preferably left at the crystallisation temperature until no further precipitation takes place. The precipitate may then be filtered off, preferably with the application of vacuum or pressure, and then washed, either on or after removal from the filter, with chilled acetone at a temperature 1–2° lower than the crystallisation temperature.

An alternative procedure which has been found particularly satisfactory is to draw off the mother liquor and washing liquids instead of filtering. In order to obtain crystals in a suitable form for this procedure, the tallow-in-acetone solution should be above 40° C. before cooling commences and gentle stirring should be carried out throughout cooling. Under these conditions the crystals settle rapidly and the mother liquor can be drawn off. The degree of removal of the lowest melting glycerides from the solid crystals will depend on the number of washes, but normally 4–8 will be sufficient. After each wash the acetone is drawn off and the acetone used in washing can conveniently be used for the crystallisation of the next batch of tallow. A combination of filtration and drawing off may conveniently be used.

The tallow may be refined before or after fractionation.

The removal of the highest melting glycerides may be carried out by means of similar techniques. When a solvent is used, the ratio of acetone to tallow is preferably in the range of 5-20 mls. per gm. of fat and the crystallisation temperature in the range of 20 to 30° C. This can be carried out before or after the removal of the lowest melting glycerides, and may likewise be carried out as two or more separate crystallisations.

It has been found that the usefulness of the tallow fractions specified can be increased by mixing them with a palm oil fraction having an iodine value not exceeding 42, a softening point in the range of about 30° C. to 45° C., preferably not more than 43° C., and a dilatation at 20° C. of not less than 1000. Preferably, the palm oil fraction has an iodine value of 30 to 36, a softening point in the range of about 30° C. to 40° C., preferably not more than 38° C., and a dilatation at 20° C. of not less than 1600, more preferably not less than 1700. Such fractions are described in co-pending application Ser. No. 565,758, filed February 15, 1956, and now abandoned.

The usefulness of the tallow fractions specified may also be increased by mixing them with a lard fraction having an iodine value within the range of about 25 to 40, and preferably 30 to 40, a softening point in the range of about 35° C. to 45° C., and a dilatation at 20° C. of not less than 1200. Preferred lard fractions are those having a softening point of not less than 43 and a dilatation at 20° C. of not less than 1500, more particularly those having a softening point within the range 35 to 40, and a dilatation of not less than 1800.

The usefulness of the tallow fractions specified may also be increased by mixing them with both the above mentioned palm oil fractions and the lard fractions.

For the determination of dilatations for the purpose of this specification, there are used a method and apparatus similar to those given in Section C–IV, 3e (52) of the "D.G.F. Einheitsmethoden," published by the Deutsche Gesellschaft für Fettwissenschaft e.V.

In the melting of fats a characteristic change of volume is observed which, especially in the case of fats solid at the normal temperature, manifests itself in a sudden increase in the volume.

The dilatation or isothermal melting expansion of a fat is the volume increase, which is expressed in $mm.^3$, determined under the conditions of the following procedure and referred to 25 g., the reference temperature being given.

The dilatometer is of glass and consists of a vertical graduated capillary tube joined at its lower end by a U-shaped capillary tube to a glass bulb surmounted by a neck which is internally ground to take a hollow ground glass stopper. The height (above the lowest point of the U-shaped capillary) of the top of the graduated tube and the top of the mouth of the bulb are 350 mm. and 70 mm., respectively. The graduations extend over a length of 250 to 290 mm., and start 1 cm. from the upper end of the tube. The graduations are marked in intervals of 5 $mm.^3$ (accurately calibrated) and cover a total volume of 900 $mm.^3$. The internal diameter of the bulb is 20 mm. and it has a volume of 7 ml. (tolerance ±0.5 ml.). The internally ground neck of the bulb tapers downwards from an internal diameter of 15 mm. to an internal diameter of 12 mm. and is 26 mm. long. The bulb of the instrument is thus below the level of the graduations on the capillary tubing. The stopper to be inserted in the mouth of the bulb is about 95 mm. in length (including the ground portion), and is hollow and is partly filled with lead shot to hold it firmly in position while a dilatation is being determined.

1.5 ml. of well boiled distilled water containing a little blue ink is pipetted into the bulb of the dilatometer. The dilatometer is then weighed. A sample of the fat to be examined is thoroughly de-gassed by heating at 100° C. under vacuum. The fat (at about 60° C.) is then poured into the bulb of the dilatometer and the ground glass stopper is inserted, care being taken not to include any air. The amount of fat added is such that, during the determination, the level of water never falls below the lowest of the graduations and never rises above the top of the graduations. If the initial water level on filling is about two-thirds of the height of the graduated capillary, these conditions are usually fulfilled. The dilatometer is re-weighed to obtain the weight of fat added. The hollow stopper is then partly filled with lead shot. It is then placed in a water bath maintained at 60° C. (±0.1°) and a reading of the level of the water in the capillary is made. This is the "base reading," $R_{60}$.

The filled dilatometer is chilled in an ice water bath for 1½ hours. It is then allowed to warm in an air bath to 26° C. at which temperature it is maintained for 40 hours. It is then again chilled in an ice water bath for 1½ hours and then placed in a water bath at 20° C. (±0.1° C.), the dilatometer being immersed to such a depth that the water level is above the middle of the ground glass stopper.

The position of the water meniscus in the capillary is read every half hour until two successive readings differ by no more than 2 $mm.^3$. The final reading ($R_t$) is used in the calculations.

A similar procedure is adopted for each temperature $t$ at which the dilatation is required. Thus $R_{20}$, $R_{25}$, $R_{30}$ and $R_{35}$ are successively determined.

Finally the dilatometer is heated again to 60° C. and the "base reading" is re-determined. If the initial and final "base reading" differ by more than 2 $mm.^3$, the whole operation must be repeated.

The calculation:

The value of the dilatation is calculated from the following formula:

$$D_t = \frac{25(R_{60} - R_t)}{W} - A$$

where $D_t$=dilatation at $t°$ C.
$W$=weight of fat taken
$R_{60}$=base reading ($mm.^3$)
$R_t$=reading of the capillary at $t°$ C. ($mm.^3$), and
$A$ is given in the table below:

| $t°$ C. | $A$ |
|---|---|
| 20 | 880 |
| 25 | 770 |
| 30 | 665 |
| 35 | 555 |

The softening point is determined after stabilising the fat by a modification of the method published by Barnicoat in "The Analyst" 69, pages 176–178. In this modified method 0.5 ml. of mercury is placed in a lipped 6 x 1 cm. test tube and the tube and contents chilled for 5 minutes in crushed ice and water. 1 ml. of fat melted at 100° C. is poured on to the mercury and the filled tube allowed to stand in ice and water for 90 minutes. A ⅛ inch diameter ball bearing is placed in the depression in the fat surface which forms when the fat is cooled. The fat in the tube is then stabilised in the same manner as described for the dilatometer, allowing the temperature to rise gradually to 26° C. and keeping it at 26° C. for 40 hours. The tube is then attached to a thermometer graduated in 1/10 of a degree so that the fat column is on a level with the thermometer bulb. This is conveniently done by attaching a metal plate to the thermometer, the plate having several holes in which a tube or tubes may be suspended by the lip or lips. The thermometer and tube or tubes are immersed in a water bath equipped for stirring so that the tube or tubes are immersed to a depth of 4.5 cms. The determination is commenced with the water bath at 20° C., at which temperature it is maintained for 20 minutes. The temperature of the water bath is then raised at the rate of 0.5° C. per minute, whilst stirring vigorously. The temperature when the steel ball has fallen half way through the fat column is recorded as the softening point. (All references in this specification to softening points and dilatations are to be construed as measured by the methods described above.)

The following examples illustrate the invention or the manufacture of fractions to be used according to the invention:

Example 1

(a) 800 g. of mutton tallow I.V. 47.3 were mixed with 3700 ml. of acetone and the mixture warmed to 45° C. The solution was then cooled to −5° C. over 1 hour whilst being gently stirred with a glass rod. It was allowed to stand for 15 minutes at −5° C. and then filtered through a cooled Büchner funnel with vacuum. The cake was pressed with a glass plunger and then washed with 1½ litres of acetone at −5° C. The cake was then removed from the filter and stirred for 10 minutes with 2 litres of acetone at −5° C. It was then filtered through a Büchner funnel and the cake washed on the filter with 500 ml. of acetone at −5° C. Residual acetone was removed from the cake by distillation under vacuum. The yield was 445 g.

(b) 415 g. of the product of stage (a) were mixed with 3 litres of acetone and the mixture warmed to 45° C. The resultant solution was cooled to 22° C. whilst gently stirring using a glass rod. It was allowed to stand at this temperature for 30 minutes with occasional stirring and then filtered through a Büchner funnel and the cake pressed and washed on the funnel with 500 ml. of acetone at 22° C. The filtrate and wash liquor were combined and the acetone removed by distillation under vacuum. The yield was 237 g. of a fraction having an I.V. of 37.2.

(c) 174 g. of the product of stage (b) were mixed with 870 ml. of acetone and the mixture warmed to 45° C. The resultant solution was then cooled to +3° C. whilst being gently stirred with a glass rod. It was allowed to stand for 15 minutes at +3° C. and then filtered through a cooled Büchner funnel with vacuum. The cake was pressed and washed with 500 ml. of acetone at +2° C. Residual acetone was removed from the cake by distillation under vacuum. The yield was 148 g. of a fraction having an I.V. of 34.1. The dilatation at 20° C. and Barnicoat softening point of the fraction were 1480 and 36.0° C. respectively.

Example 2

(a) 550 g. of beef tallow I.V. 47.0 were mixed with 2750 ml. of acetone and the mixture warmed to 45° C. The solution was then cooled to +2° C. over 45 minutes whilst being gently stirred with a glass rod. It was allowed to stand for 15 minutes at +3° C. and then filtered through a cooled Büchner funnel with vacuum. The cake was pressed and washed with 1 litre of acetone at 0° C. The cake was then removed from the filter and stirred for 10 minutes with 1½ litres of acetone at 0° C. It was then filtered through a cooled Büchner funnel and the cake washed on the filter with 500 ml. of acetone at 0° C. Residual acetone was removed from the cake by distillation under vacuum. The yield was 250 g. of a fraction having an I.V. of 31.0.

(b) 241 g. of the product of stage (a) were mixed with 1450 ml. of acetone and the mixture warmed to 45° C. The resultant solution was cooled to 22° C. whilst gently stirring using a glass rod. It was allowed to stand at this temperature for 30 minutes with occasional stirring and then filtered through a Büchner funnel and the cake pressed and washed with 240 ml. of acetone at 22° C. on the funnel. The filtrate and wash liquor were combined and the acetone removed by distillation under vacuum. The yield was 155 g. of a fraction having an I.V. of 39.6.

(c) 155 g. of the product of stage (b) were mixed with 930 ml. of acetone and the mixture warmed to 45° C. The resultant solution was cooled to +2° C. whilst being gently stirred with a glass rod. It was allowed to stand for 15 minutes at +2° C. when the clear mother liquor was syphoned off. 700 ml. of acetone at 0° C. were then added and the mixture stirred for several minutes. The mixture was allowed to stand for 30 minutes at 0° C. and then filtered through a cooled Büchner funnel with vacuum. The cake was pressed and washed with 400 ml. of acetone at 0° C. Residual acetone was removed from the cake by distillation under vacuum. The yield was 102 g. of a fraction having an I.V. of 30.9. The dilatation at 20° C. and Barnicoat softening point of the fraction were 1485 and 35.2° C. respectively.

Example 3

(a) 670 g. of mutton tallow I.V. 47.3 were mixed with 3350 ml. of acetone and the mixture warmed to 45° C. The solution was then cooled to 0° C. over 1 hour whilst being gently stirred with a glass rod. It was then allowed to stand for 15 minutes at 0° C. and then filtered through a cooled Büchner funnel with vacuum. The cake was pressed with a glass plunger and then washed with 1200 ml. of acetone at 0° C. The cake was then removed from the filter and stirred for 10 minutes with 2300 ml. of acetone at 0° C. It was then filtered through a Büchner funnel and the cake washed on the filter with 1000 ml. of acetone at 0° C. Residual acetone was removed from the cake by distillation under vacuum. The yield was 331 g. of a product having an I.V. of 26.7.

(b) 309 g. of the product of stage (a) were mixed with 1850 ml. of acetone and the mixture warmed to 45° C. The resultant solution was cooled to 23° C. whilst gently stirring with a glass rod. It was allowed to stand at this temperature for 30 minutes with occasional stirring and then filtered through a Büchner funnel and the cake pressed and washed on the funnel with 200 ml. of acetone at 23° C. The filtrate and wash liquor were combined and the acetone removed by distillation under vacuum. The yield was 173 g. of a fraction having an I.V. of 35.9.

(c) 170 g. of the product of stage (b) were mixed with 1020 ml. of acetone and the mixture warmed to 45° C. The resultant solution was then cooled to 2° C. whilst being gently stirred with a glass rod. It was then allowed to stand for 15 minutes at 2° C. and then filtered through a cooled Büchner funnel with vacuum. The cake was then pressed and washed with two portions of 350 ml. acetone at 2° C. Residual acetone was removed from the cake by distillation under vacuum. The yield was 116 g. of a product having an I.V. of 31.5. The dilatation at 20° C. and Barnicoat softening point of the fraction were 1620 and 37.3° C. respectively.

Example 4

(a) 650 g. of beef tallow I.V. 41.3 were mixed with 3900 ml. of acetone and the mixture warmed to 45° C. The solution was then cooled to 0° C. over 1 hour whilst being gently stirred with a glass rod. It was then allowed to stand for 15 minutes at 0° C. and then filtered through a cooled Büchner funnel with vacuum. The cake was pressed with a glass plunger and then washed with 1000 ml. of acetone at 0° C. The cake was then removed from the filter and stirred for 10 minutes with 1500 ml. of acetone at 0° C. It was then filtered through a Büchner funnel and the cake washed on the filter with 1000 ml. of acetone at 0° C. Residual acetone was removed from the cake by distillation under vacuum. The yield was 293 g.

(b) 293 g. of the product of stage (a) were mixed with 1760 ml. of acetone and the mixture warmed to 45° C. The resultant solution was cooled to 23° C. whilst gently stirring with a glass rod. It was allowed to stand at this temperature for 30 minutes with occasional stirring and then filtered through a Büchner funnel and the cake pressed and washed on the funnel with 200 ml. of acetone at 23° C. The filtrate and wash liquor were combined and the acetone removed by distillation under vacuum. The yield was 167 g. of a fraction having an I.V. of 31.1. The dilatation at 20° C. and Barnicoat softening point of the fraction were 1650 and 35.0° C. respectively.

*Example 5*

Samples of plain chocolate were prepared from the following formulae (i)

400 g. plain "refiner paste" (containing 112 g. cocoa-butter)
39 g. additional cocoa-butter
27 g. mutton tallow fraction (I.V. 31.5, $D^{20}$ 1620, and Barnicoat softening point 37.3° C. prepared as in Example 3c)

(ii)

400 g. plain "refiner paste" (containing 112 g. cocoa-butter)
21 g. additional cocoa-butter
45 g. beef tallow fraction (I.V. 31.1, $D^{20}$ 1650, and Barnicoat softening point 35.0° C. prepared as in Example 4b)

The fat in Formula i contained 1.5 parts of mutton tallow fraction per 8.5 parts of cocoa-butter and the fat in Formula ii contained 1 part of beef tallow fraction per 3 parts of cocoa-butter.

The samples were satisfactory in appearance, taste, melting and texture characteristics in the mouth and on manual fracturing gave a characteristic "snap."

The tallow fractions were refined, bleached and deodorised before use.

We claim:

1. A chocolate composition comprising decorticated cocoa bean, sugar and additional fat, the fat phase of the composition consisting essentially of cocoa-butter and a tallow fraction obtained from a tallow of the group consisting of mutton and beef tallow, said fraction having an iodine value within the range of 28 to 40, a softening point within the range of 30° to 45° C., and a dilatation at 20° C. of not less than 1200, the said tallow fraction being present at a level of from 5% to 30% by weight of the mixture of cocoa-butter and tallow fraction.

2. The chocolate composition of claim 1 wherein the fat phase additionally contains a minor amount of milk fat.

3. A chocolate composition comprising decorticated cocoa bean, sugar and additional fat, the fat phase of the composition consisting essentially of cocoa-butter and a tallow fraction obtained by removal from a tallow of the group consisting of mutton and beef tallow of from about 35% to about 55% by weight of the lowest melting glyceride fraction, the tallow fraction being present in the mixture of cocoa-butter and tallow fraction at a level of from 5% to 30% by weight of the mixture.

4. The chocolate composition of claim 3 wherein the fat phase additionally contains a minor amount of milk fat.

5. The product of claim 1 wherein the tallow fraction has an iodine value within the range 28 to 35, a softening point within the range 30° to 40° C., and a dilatation at 20° C. of not less than 1500.

6. A fat composition for use in making chocolate and confectionery which consists essentially of a mixture of cocoa-butter and a tallow fraction obtained from a tallow of the group consisting of mutton and beef tallow, said fraction having an iodine value in the range of 28 to 40, a softening point in the range of 30° to 45° C., and a dilatation at 20° C. of not less than 1200, and said tallow fraction being present in said mixture at a level of from 5% to 30% by weight of the mixture.

7. The fat composition of claim 6 in which the tallow fraction has an iodine value in the range of 28 to 35, a softening point in the range of 30° to 40° C., and a dilatation at 20° C. of not less than 1500.

References Cited in the file of this patent

UNITED STATES PATENTS

| | | |
|---|---|---|
| 2,468,799 | Ziels | May 31, 1949 |
| 2,586,615 | Cross | Feb. 19, 1952 |

FOREIGN PATENTS

| | | |
|---|---|---|
| 590,916 | Great Britain | July 31, 1947 |

OTHER REFERENCES

Riemenschneider et al.: "Oil and Soap," 1946, pp. 276 to 282.

Lord: "Everybody's Cookbook," pp. 121 and 231. Copyright 1937 by Harcourt, Brace and Company, New York.

Bailey: "Industrial Oil and Fat Products," 2nd Ed., 1951 (pp. 139 and 140).

Jensen: "The Chemistry, Flavoring and Manufacture of Chocolate Confectionery and Cocoa," pp. 190–192 (2nd Edition), 1951.